United States Patent [19]

Hoskinson et al.

[11] Patent Number: 4,676,051
[45] Date of Patent: Jun. 30, 1987

[54] METHOD AND APPARATUS FOR FORMING, FILLING AND SEALING BAGS MADE FROM A CONTINUOUS PLASTIC SHEET

[75] Inventors: Marlin J. Hoskinson, Philadelphia, Pa.; Eugene Lorincz, Cinnaminson, N.J.

[73] Assignee: Moore Push-Pin Company, Wyndmoor, Pa.

[21] Appl. No.: 920,413

[22] Filed: Oct. 20, 1986

[51] Int. Cl.⁴ ..................... B65B 9/08; B65B 43/04
[52] U.S. Cl. ........................ 53/451; 53/455; 53/552; 53/562; 53/373
[58] Field of Search ............. 53/451, 455, 463, 551, 53/552, 555, 562, 373

[56] References Cited

U.S. PATENT DOCUMENTS

| | | |
|---|---|---|
| 2,334,256 | 11/1943 | Eaton . |
| 2,385,229 | 9/1945 | Patterson . |
| 3,050,916 | 8/1962 | Gausman et al. ............ 53/552 |
| 3,052,074 | 9/1962 | Dreeben ...................... 53/552 |
| 3,061,989 | 11/1962 | Newell et al. ............... 53/552 |
| 3,319,538 | 5/1967 | Bodolay et al. . |
| 3,397,505 | 8/1968 | Critchell ..................... 53/74 |
| 3,426,499 | 2/1969 | Paige . |
| 3,731,451 | 5/1973 | Sexstone et al. . |
| 3,815,318 | 6/1974 | Lerner . |
| 4,144,693 | 3/1979 | Ogata ......................... 53/433 |
| 4,235,064 | 11/1980 | Wenger ..................... 53/552 X |
| 4,254,601 | 3/1981 | Prager et al. .............. 53/552 X |
| 4,322,929 | 4/1982 | Neumann . |
| 4,391,081 | 7/1983 | Kovacs ...................... 53/436 |
| 4,512,138 | 4/1985 | Greenawalt ............... 53/552 X |

OTHER PUBLICATIONS

Autobag H-100 brochure, Jun. 1971, Automated Packaging Systems, Inc.
Autobag Systems brochure, Jun. 1983, Automated Packaging Systems, Inc.
Filmstar III brochure, Feb. 1980, Sigma Systems, Inc.
Rennco Packaging Machines and Systems Bulletin 100, Jan. 1983, Rennco, Inc.
Bodolay C-100 brochure, Bodolay Packaging Machinery, Inc.
New 201 Series of Automatic Roll Stock Film Packaging Machines, Form No. 1272, Rennco, Inc.
"The Filmstar V" brochure, Sigma Systems, Inc.
Packaging Machinery Operations—Form-Fill-Sealing, C. Glenn Davis, Apr. 1982, Packaging Machinery Manufacturers Institute, pp. 2-8, 2-11 and 5-3.

Primary Examiner—Horace M. Culver
Attorney, Agent, or Firm—Howson and Howson

[57] ABSTRACT

A plastic bag is formed, filled, sealed and separated from a continuous web of longitudinally folded plastic material. The web passes downwardly between complementary L-shaped heat sealing jaws that reciprocate and cooperate to provide seams which form a pocket that is closed after it has been filled from above and indexed downwardly. The top seam of one pocket is formed simultaneously with the bottom seam of an adjacent pocket and a weakened line of juncture is provided therebetween. Grippers carried on the heat sealing jaws engage opposite sides of the plastic web above the location of the top seam of the filled pocket and cooperate with a separator that tensions the web along the weakened line to rupture the filled pocket from the web while the web is still in a thermally weakened condition.

25 Claims, 13 Drawing Figures

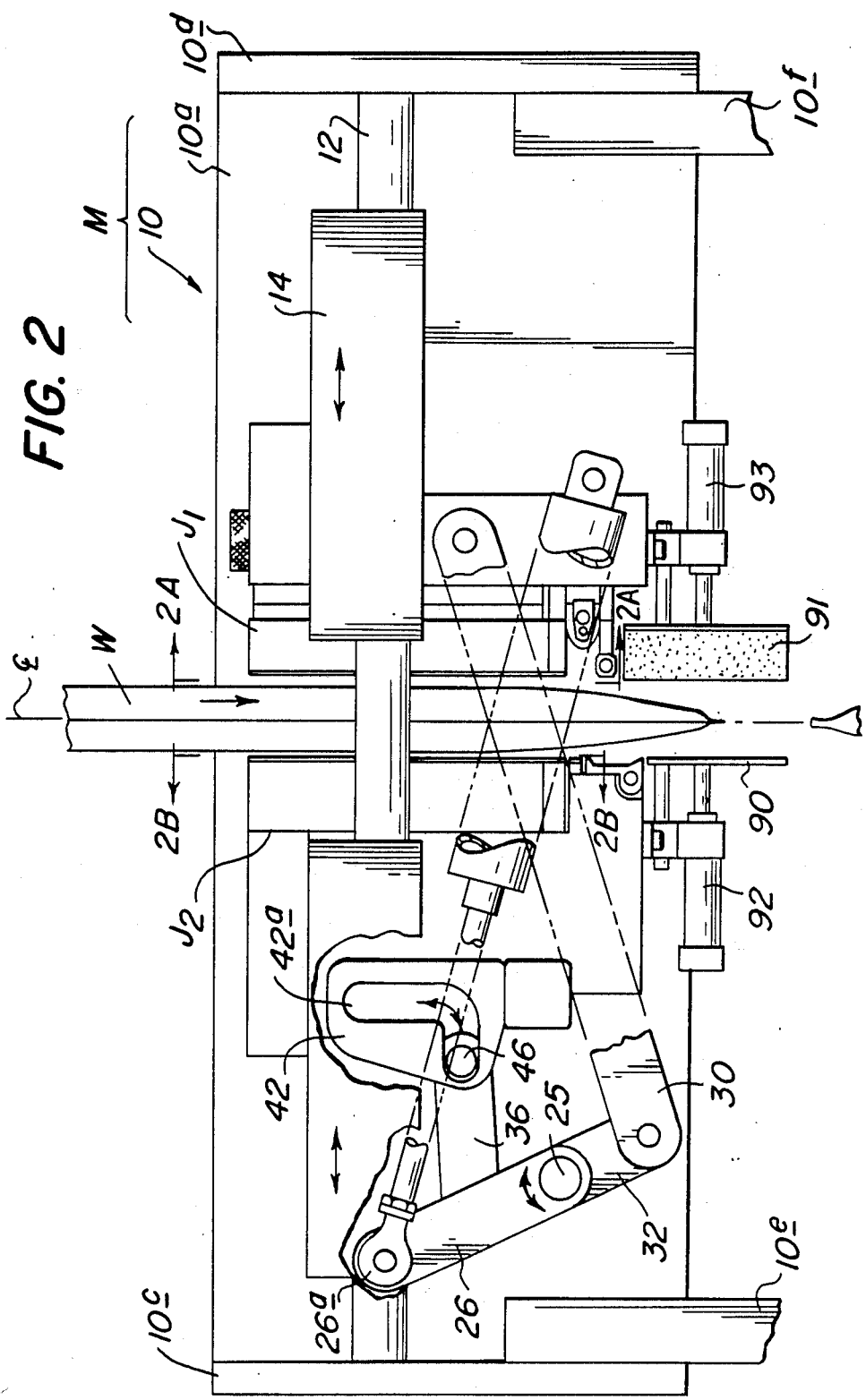

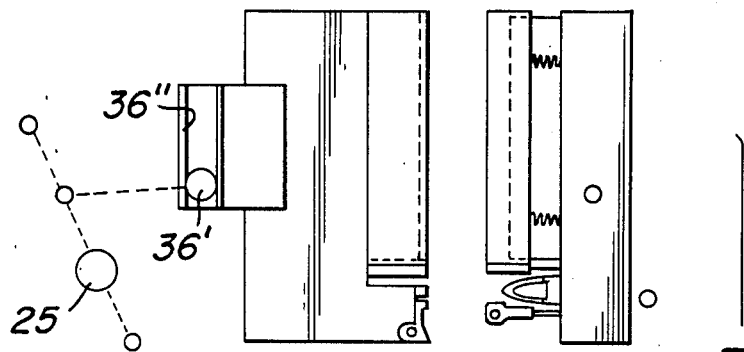
FIG. 4
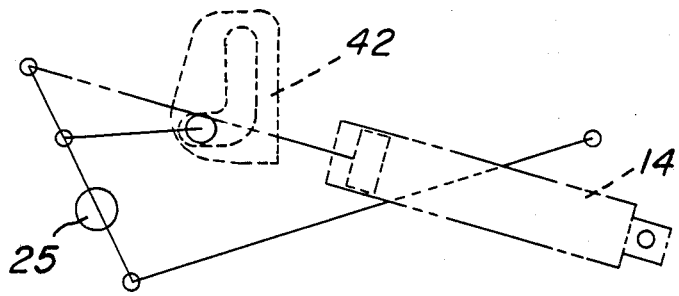
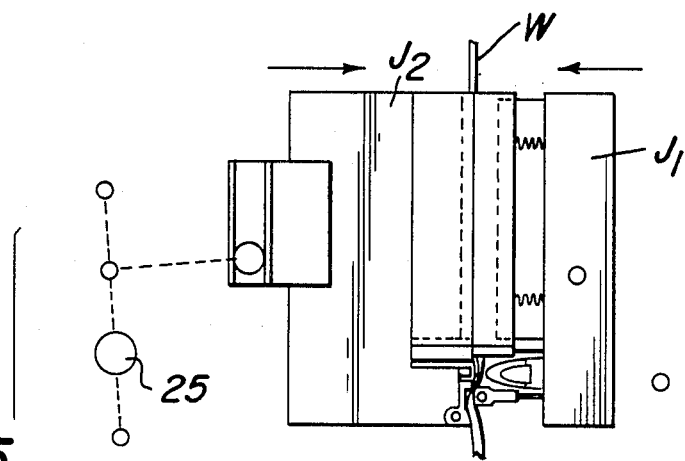
FIG. 5
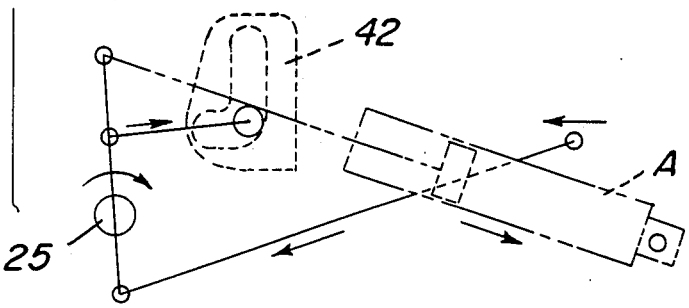

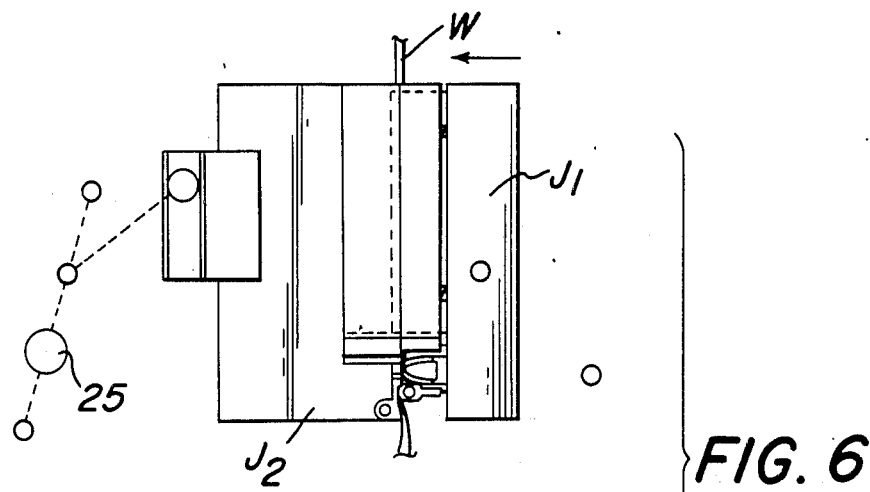
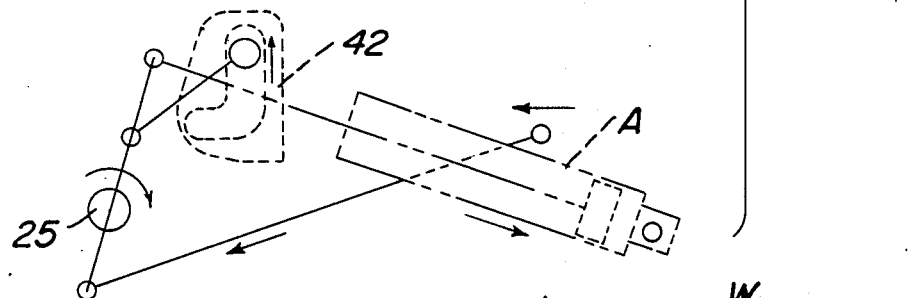
FIG. 6
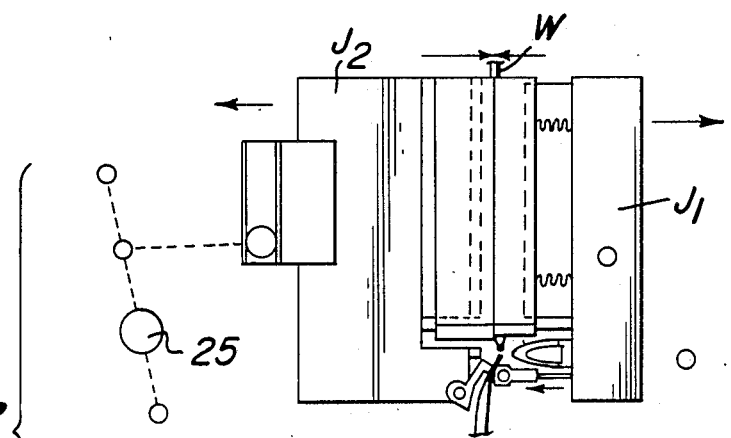
FIG. 7
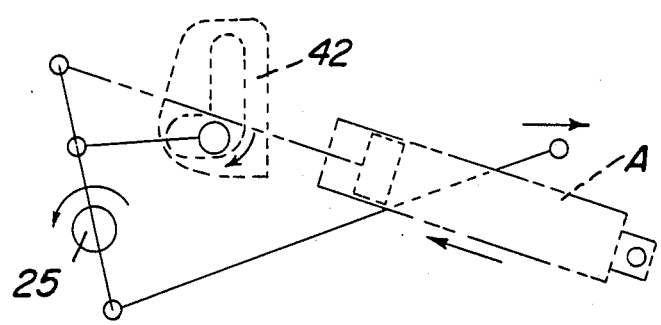

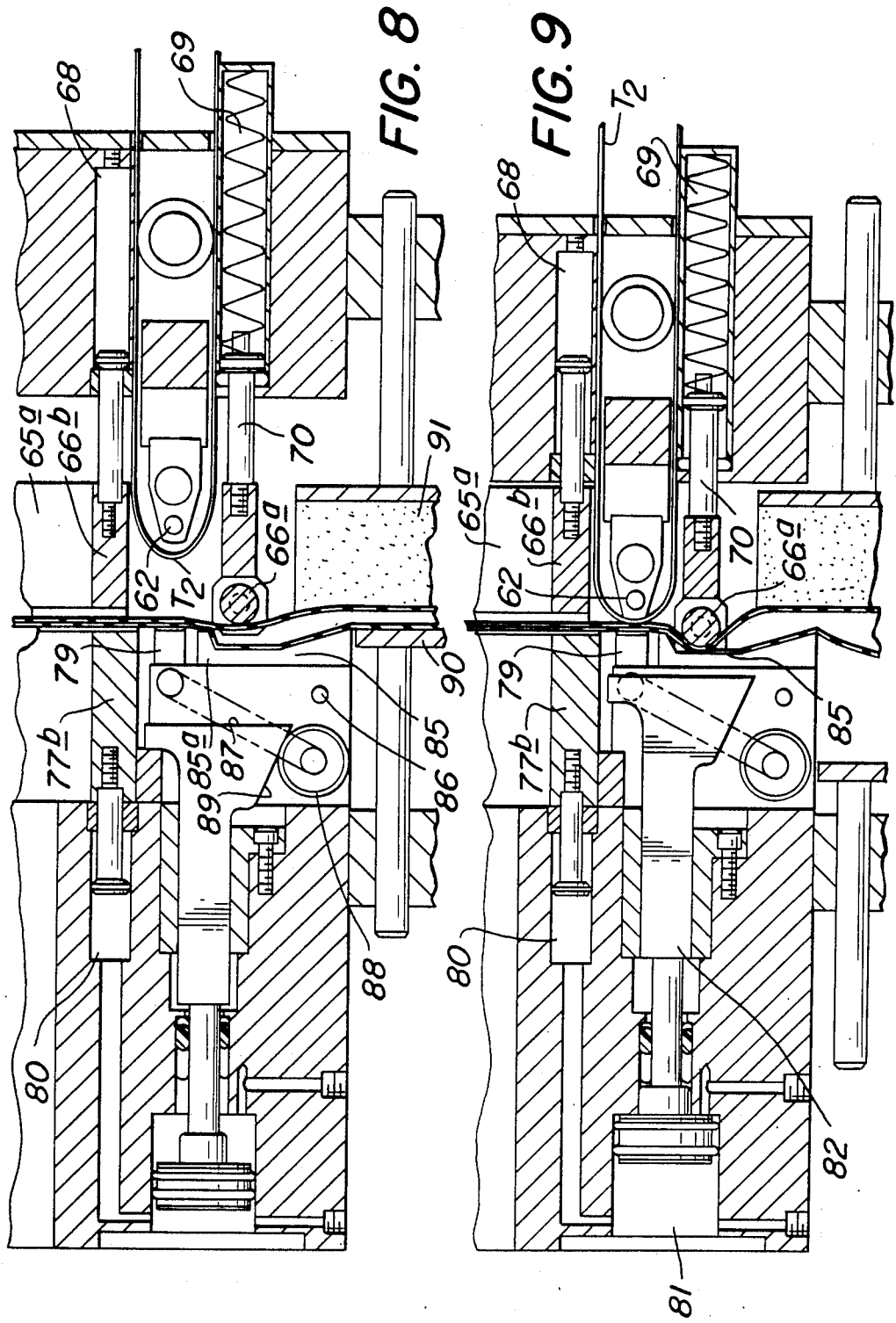

METHOD AND APPARATUS FOR FORMING, FILLING AND SEALING BAGS MADE FROM A CONTINUOUS PLASTIC SHEET

FIELD OF THE INVENTION

The present invention relates to bag forming, filling and sealing methods and machinery, and more particularly, the present invention relates to a method and apparatus for forming and filling bags from a continuous sheet of plastic material.

BACKGROUND OF THE INVENTION

Methods and apparatus are known for forming, filling and sealing bags formed from a continuous sheet of material. In conventional apparatus, a folded sheet of vertically disposed material is advanced longitudinally and heat sealed to form a bag, or pouch, which is gravitationally loaded by means of a declining chute connected to an elevated hopper. After the bag has been formed and loaded, its upper end is seamed to completely seal the bag. The thus filled bag is subsequently severed from the web. Machines of this general nature are disclosed in the following U.S. Pat. Nos.: 2,334,256; 2,385,229; 3,426,499; 3,731,451; 3,815,318; 4,144,693; 4,235,064; 4,322,929; and 4,391,081. Other types of packaging machines are disclosed in U.S. Pat. Nos. 3,319,538 and 3,397,505. Related types of commercially available packaging machines are sold by Rennco, Inc. of Homer, Mich.; Automated Packaging Systems, Inc. of Twinsburg, Ohio; and Bodolay-Pratt of Lakeland, Fla.

A limiting factor in the reliability of a plastic bag forming a filling machine resides in the means utilized to separate the filled bag from the web from which it is formed. Known machines use knives, hot wires, and the like to effect separation. These separating mechanisms are undesirable, however, because the plastic accumulates thereon and causes them to malfunction. As a result, the machinery must be stopped periodically and cleared.

Another acute problem is caused by the composition and quality of the plastic composing the web. For instance, when hot knives and wires are used as the bag separating means, their proper functioning is dependent on the composition and quality of the plastic, since different plastic materials, and variations in quality with a given roll of plastic, change the heat requirements needed to effect proper bag separation. This creastes further machine set-up and operating problems. In addition, the burning of the material by the hot wires causes undesirable fumes to be generated, and this is unsatisfactory.

While each of the aforedescribed patented and commercially available machines may function satisfactorily for its intended purpose, there is a need for machinery which can operate in a reliable method with minimal maintenance to form, fill and seal bags made from a continuous web of plastic at relatively high rates of production. Furthermore, there is a need for a machine of the aforedescribed type which is tolerant of variations in plastic composition and quality and which can operate with a minimum of downtime and with a minimum of operator adjustments. Moreover, a commercially-desirable machine should also be capable of being run by a relatively unskilled operator.

OBJECTS OF THE INVENTION

With the foregoing in mind, a primary object of the present invention is to provide a novel method and apparatus for forming, and filling and sealing bags made from a continuous sheet of plastic, and of doing so at relatively high production rates.

Another object of the present invention is to provide an improved method and apparatus for reliably producing filled plastic bags in a trouble-free manner at relatively high production rates.

A further object of the present invention is to provide a unique bag forming, filling and sealing machine which operates smoothly and reliably for prolonged periods of time with minimal operator intervention.

As a still further object, the present invention provides an efficient machine which operates in a novel manner to form, fill, seal, and sever bags from a continuous web of plastic.

SUMMARY OF THE INVENTION

More specifically, in the present invention, bags are formed, filled, sealed and severed in a high speed trouble-free manner from a continuous web of folded plastic material as it advances downwardly through the machine frame. Complementary L-shaped heat sealing jaws are mounted in the frame for lateral reciprocation with respect to opposite sides of the web for providing a bottom seam, a side seam, and a top seam after the bag has been filled. The top and bottom seams are provided by a specially-shaped heater bar and anvil which cooperate simultaneously to provide the bottom seam of one pocket and the top seam of a downstream pocket while forming a weakened line of juncture therebetween. The filled bag is then separated from the web by downward tension which ruptures the web along the weakened line of juncture. Downward tension is applied by a roller which is biased into engagement with the web and rotated about is axis when a counterbiased nip platen is pivoted relative to the roller axis. In the illustrated embodiment, the longitudinal side seam extends inwardly of the folded edges of the plastic web and the edge margin is continuously separated from the plastic web by a constant tensioning device which pulls downwardly and laterally on the edge margin to ensure that it is laterally separated before the filled bags are separated from the web.

BRIEF DESCRIPTION OF THE DRAWINGS

The foregoing and other objects, features and advantages of the present invention should become apparent from the following description when taken in conjunction with the accompanying drawings, in which:

FIG. 2 is a fragmentary side elevational view of a preferred bag forming machine embodying the present invention;

FIG. 4 is a schematic illustration of certain machine components in a home position at the beginning of a bag forming cycle;

FIG. 5 is an illustration, similar to FIG. 4, but illustrating the position of the components in a preliminary stage of the bag forming cycle;

FIG. 6 is a view, similar to FIG. 4, but illustrating the components of the machine in the seaming stage of the bag forming cycle;

FIG. 7 is a view, similar to FIG. 4, but illustrating the position of the components upon completion of the bag filling and sealing portions of the bag forming cycle as the bag is being separated from the web and the machine components are returning to their home position illustrated in FIG. 4;

FIG. 8 is an enlarged sectional view illustrating primarily the bag separating assembly of the machine of the present invention in the position corresponding to schematic FIG. 5;

FIG. 9 is a view similar to FIG. 8 but illustrating the relative positions of the separating assembly components during the seaming portion of the bag forming cycle as illustrated in FIG. 6;

DESCRIPTION OF THE PREFERRED METHOD AND APPARATUS

Figure 1:
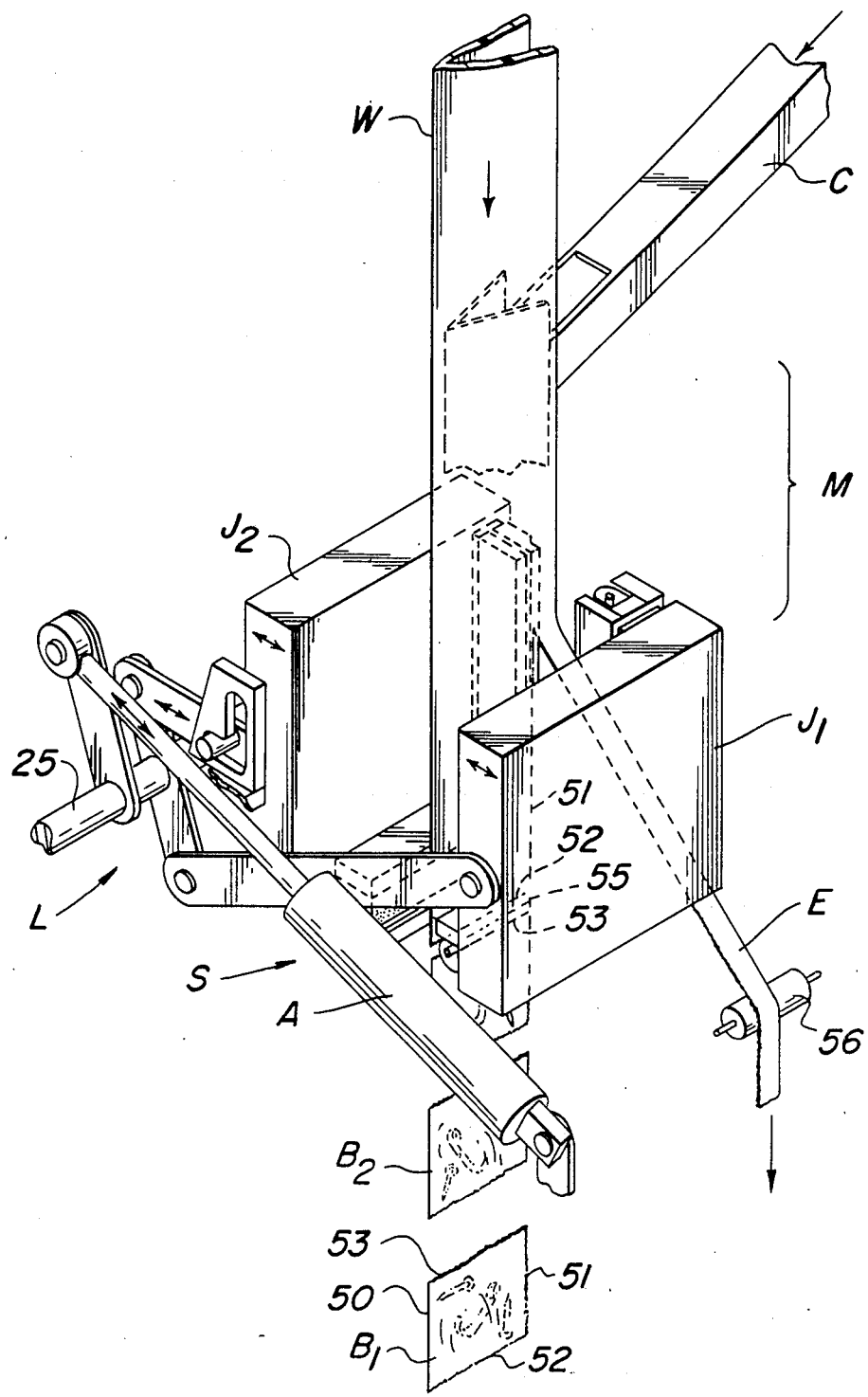
FIG. 1 is a somewhat schematic, fragmentary perspective view illustrating the cooperation of certain components of the machine utilized in practicing the method of the present invention.

Referring now to the drawings, FIG. 1 illustrates somewhat schematically and in perspective portions of the appratus which is preferably used to practice the method of the present invention. As best seen therein, a web W of longitudinally folded plastic is fed downwardly in the direction indicated by the arrow into a machine indicated generally at M, and sealed and filled bags $B_1$, $B_2$ fall downwardly from the machine M into an appropriate receptacle (not shown). Prior to bag closure, parts are charged automatically into each partially formed bag B via a chute C connected at its upper end to a hopper (not shown). Primary and secondary heat sealing jaw assemblies $J_1$, $J_2$, respectively are mounted in the machine M for reciprocation laterally with respect to the plastic web W in the direction indicated by the arrows. Movement of the jaw assemblies $J_1$, $J_2$ is effected by a linkage mechanism L connected to a fluid actuator A, which in the present instance, is an air cylinder. The major portion of a bag separating mechanism is located in the region S of the jaw assemblies $J_1$, $J_2$ but is not illustrated in detail in FIG. 1 for purposes of clarity. In the illustrated embodiment, continuous downward tension is applied to the web W as a separated longitudinal edge margin E thereof is stripped from the side of the web W, i.e., toward the rear in FIG. 1. Appropriate position sensors and electronic circuitry is provided for controlling the operation of the machine M in the manner to be described.

Referring now to FIG. 2, the machine M includes a frame 10 which comprises upright side panels 10a, 10b extending between upright end panels 10c, 10d which may be, and preferably are, supported on legs at the intersections thereof, such as the legs 10e, 10f. The longitudinally folded plastic web W is advanced vertically downward through the machine frame 10 centrally thereof by an indexing mechanism of conventional design which both pulls the folded web W from a supply roll and pushed downwardly on the folded web from above. The folded web W passes downwardly between the primary and secondary heat sealing jaw assemblies $J_1$ and $J_2$ respectively, which are mounted for reciprocation laterally of the web W in the machine frmae 10 on a pair of horizontally separated parallel guide rods, such as the guide rod 12, extending between the right hand machine frame member 10d and the left hand machine frame member 10c. As best seen in FIG. 3, each jaw assembly, such as the primary jaw assembly $J_1$, includes a pair of low friction linear bushings, 14, 15 which slide on the guide rods 12, 13, respectively. The primary jaw assembly $J_1$ extends between the linear bushings 14 and 15 and is connected thereto by brackets 16 and 17, respectively. The complementary secondary jaw assembly $J_2$ is mounted for sliding movement on the guide rods 12 and 13 in a manner similar to the manner in which the primary jaw assembly $J_1$ is mounted, having linear bushings 18 and 19 connected to brackets 20 and 21 to which the jaw assembly $J_2$ is connected. Thus, when driven, the jaw assemblies $J_1$, $J_2$ are capable of reciprocating laterally with respect to the web W in the direction indicated by the arrows in FIG. 3.

The jaw assemblies $J_1$, $J_2$ are driven by the actuator A and linkage L connected thereto. To this end, as best seen in FIG. 3, the linkage L includes a rocker shaft 25 which extends transversely across the machine frame between the side frame members 10a, 10b. An arm 26 is secured to the shaft 25 and projects upwardly therefrom. See FIG. 2. The upper end 26a of the arm 26 is connected to a rod 27 which is slidably mounted within the cylinder portion 28 of the actuator A. The cylinder 28 is pivotally connected to the side frame member 10b as by a trunnion 29 (FIG. 3). Thus, retraction of the actuator rod 27 rotates the rocker shaft 25 clockwise, and extension of the actuator rod 27 rotates the shaft 25 counterclockwise as indicated in FIG. 2. As best seen in FIGS. 2 and 3, the primary jaw assembly $J_1$ is connected to the rocker shaft 25 by a pair of elongate links 30, 31 each of which is connected to a short arm fastened to the rocker shaft 25, such as the short arm 32 connected to the link 30. As a result, clockwise pivotal movement of the shaft 25 displaces the link 30 leftward and causes the primary jaw assembly $J_1$ to slide leftward on its guide rods 12 and 13 an amount corresponding to the angular displacement of the rocker shaft 25.

The secondary jaw assembly $J_2$ is also displaced by movement of the rocker shaft 25. To this end, as best seen in FIG. 3, the rocker shaft arm 32 has an upper end 32b connected to a short link 36 having an end portion which is connected at 36a to a spur 38 projecting from the secondary jaw assembly bracket 20. The secondary jaw assembly bracket 21 is similarly connected to the rocker shaft 25 by spur 39 and short link 40. Thus, as best seen in FIG. 2, when the rocker shaft 25 pivots clockwise from the home position illustrated, the primary jaw assembly $J_1$ moved leftward, and the secondary jaw assembly $J_2$ simultaneously moved rightward toward the centerline $C_L$ of the web W.

As the secondary jaw assembly $J_2$ engages the side of the web W, its movement rightward is arrested while leftward movement of the primary jaw assembly $J_1$ is permitted to continue. To this end, lost motion connections are provided between the secondary jaw assembly $J_2$, links 36 and 40, and the machine frame members 10b and 10a, respectively. As best seen in FIG. 2, the lost motion connections include cams 42 and 44 fastened to the frame members 10b, 10a, respectively. Each cam has an L-shaped slot, such as the slot 42a in the cam 42. The cam slots slidably receive followers 46 and 48 mounted on the ends of the links 36 and 40, such as the follower 46 mounted on the end of the link 36 in FIG. 2. The links 36 and 40 are also connected to the secondary jaw assembly $J_2$ by cam followers 36', 39' engaging in vertical slots, 36'', 39''. See FIG. 4. Thus, as the rocker shaft 25 pivots clockwise from its home position illustrated in FIG. 2, it displaces the secondary jaw assembly $J_2$ righward until such time as the follower 46 engages the bight of the L-shaped camming slot 42a, whereupon the follower 46 moves upwardly. This enables the link 36 to pivot counterclockwise and its pin 36' to move upwardly in the slot 36'', thereby arresting rightward movement of the secondary jaw assembly $J_2$ while permitting the primary jaw assembly $J_1$ to continue its leftward movement toward the centerline of the web W. Accordingly, movement of the secondary jaw assembly $J_2$ is arrested at a predetermined precise location with respect to the centerline $C_L$ of the web W.

In accordance with the method of the present invention, the bags B are formed, filled, sealed and separated continuously in the machine M. Each bag, such as the lower bag $B_1$ in FIG. 1, is characterized by a vertically disposed fold 50 extending along one edge of the bag $B_1$ and a vertical edge seam 51 extending parallel thereto opposite the folded edge 50. A bottom seam 52 extends transversely across the bottom of the bag $B_1$ and intersects the edges 50 and 51 thereof, and a top seam 53 likewise extends across the top of the bag $B_1$ to define the perimeter of the bag $B_1$.

In the present instance, the web of plastic W is of thermoplastic sheet stock, such as low density polyethylene (LDPE), and the seams 51, 52, and 53 are formed by heat sealing the folded web W between the heat sealing jaw assemblies $J_1$, $J_2$. For this purpose, the heat sealing jaw assemblies $J_1$, $J_2$ are arranged in a generally L-shaped elevational configuration and in vertical planes on opposite sides of the web W. The heat sealing and anvile portions of the primary and secondary jaw assemblies $J_1$, $J_2$ are dimensioned so that the vertical seams 51 of a plurality of bags B are formed when the jaw assemblies $J_1$, $J_2$ are brough together and heat applied therebetween. Simultaneously therewith, the horizontal heat sealing and anvil portions of the jaw assemblies $J_1$, $J_2$ form the bottom seam 52 of one bag, such as the bag $B_1$, the top seam 53 of the immediately preceding bag, such as the bag $B_2$ and a weakened line of juncture 55 therebetween. See FIG. 11. As will be described, the weakened line of juncture 55 permits the bags to be separated from one another when downward tension is applied to a filled bag for thereby rupturing the weakened line of juncture 55.

The web edge E is separated from the longitudinal side seam 51 by a conventional constant tension take-up means, such as a drum 56 that pulls laterally and downwardly simultaneously with formation of the horizontal seams 52, 53 from between the jaw assemblies $J_1$, $J_2$ while the vertical seam is in a thermally softened state. As a result, the web edge E is continuously attached to the web W above the location where the transverse seams are formed, thereby enabling advancing tension to be applied by the constant tension mechanism, such as indicated at 56 (FIG. 1). An indexing mechanism of conventional design cooperates with the constant tension device to advance the web W downwardly through predetermined increments, depending on the desired length of the finished bag.

Parts are charged into the bag during that period of the forming cycle after which the side seam 51 and bottom seam 52 have been formed but before the web W is indexed downwardly and the top closure seam 53 formed. During this period, the web is gripped above its bottom seam 52 to protect the same by preventing falling parts from striking the seam 52 prematurely and thereby ripping the same. The grip is released just prior to indexing of the web.

Web indexing occurs in timed relation with the movement of the heat sealing jaw assemblies $J_1$, $J_2$. The timing is predetermined to allow sufficient time for the bottom seam 52 and side edge seam 51 to set up without allowing sufficient time for the weakened line of juncture 55 between the transverse seams to become sufficiently strong as to make it difficult to separate the bags from the web by rupturing the same in the manner described. By way of example, and not by way of limitation, for a thermoplastic web W of LDPE having a thickness of 2 mils., a preferred heating cycle is about 0.2 to about 0.4 seconds with the heating jaw assemblies $J_1$, $J_2$ in contact with the sides of the web W under a pressure of about 200 psi. and at a heating jaw surface temperature of about 350° F. to about 400° F. Parts are charged from the chute C into the partially thus-formed bag while the web is still gripped and before the jaw assemblies $J_1$, $J_2$ begin to separate from the web W. Bags are formed, filled, sealed, and separated at a rate of about 50–60 finished bags per minute.

For purposes of explanation, the jaw assembly which carries the heating elements is regarded as the primary jaw assembly $J_1$, and the complementary jaw assembly which serves as a back-up for the primary jaw assembly $J_1$ is regarded as the secondary jaw assembly $J_2$. The actuator A and related web indexing apparatus, the heating cycle power and timing, and sealing pressure, among other functions, such as position sensing, is automatically controlled by a programmable controller which operates through various electronic sensors, solenoid air valves, and related mechanisms to effect the desired sequential operation of the various components of the machine M in the manner described. Since the controller utilzies state of the art electronics, it will not be discussed in detail herein except to the extent necessary to explain the functional interaction of the various machine elements.

Figure 2A:
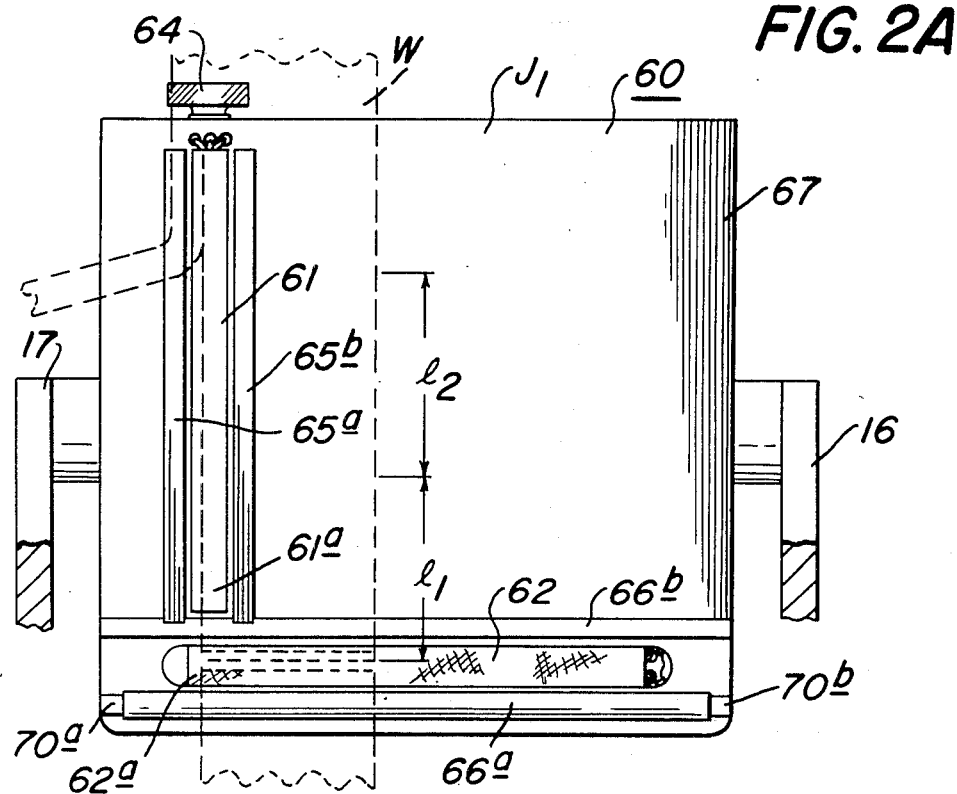
FIG. 2A is a sectional view taken on line 2A—2A of FIG. 2.
Figure 2B:
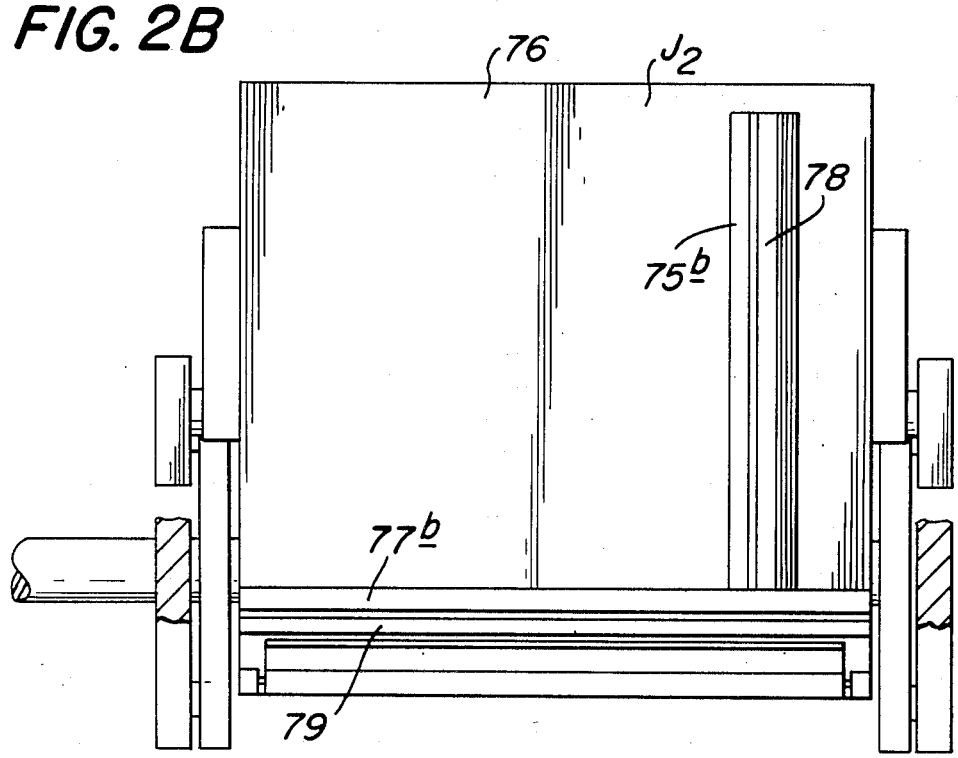
FIG. 2B is a sectional view taken on line 2B—2B of FIG. 2.
Figure 3:
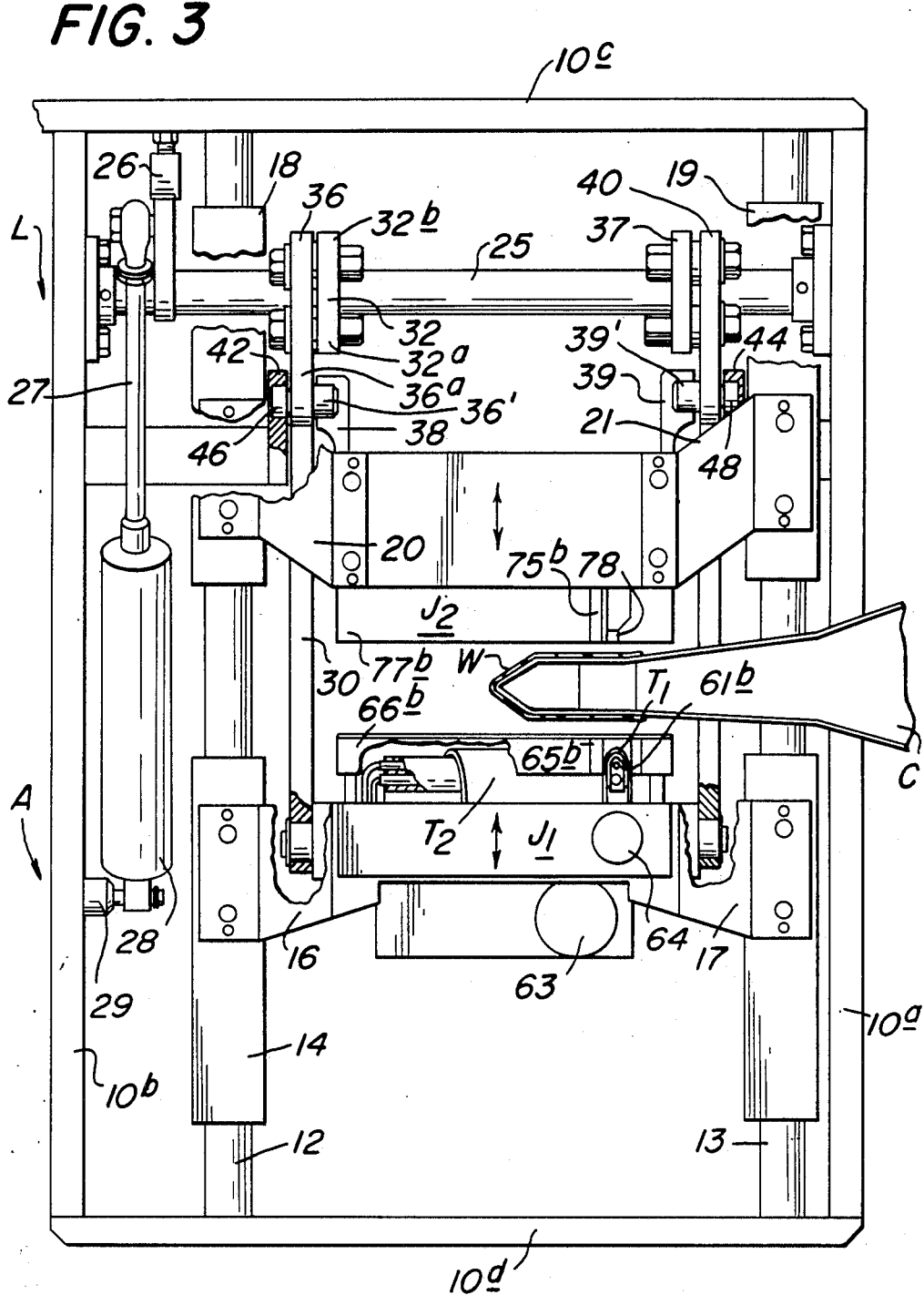
FIG. 3 is a plan view of the machine illustrated in FIG. 2 but with portions broken away and sectioned to illustrate details of construction.

As best seen in FIG. 2, the primary jaw assembly $J_1$ is illustrated in FIG. 2A, and the secondary jaw assembly $J_2$ is illustrated in FIG. 2B. FIG. 2A is a view looking rightward in FIGS. 2 and 3, and FIG. 2B is a view looking leftward in FIGS. 2 and 3. The web W is superimposed in phantom lines in FIG. 2A to illustrate its relationship to the primary jaw assembly $J_1$.

Referring now to FIG. 2A, the primary jaw assembly $J_1$ includes a platen 60 mounting a vertical heater bar 61 along one side portion thereof and a horizontal heater bar 62 along the lower portion thereof. The horizontal heater bar 62 has a left hand end portion 62a which underlies the lower end portion 61a of the vertical heater bar 61. The horizontal heater bar 62 extends completely across the width of the web W and, in the illustrated embodiment, therebeyond for a sufficient distance to enable webs of various widths to be accommodated within the machine M. The vertical heater bar 61 extends upwardly from the horizontal heater bar 62 a distance corresponding to at least two bag lengths (measured in the vertical direction) as indicated by the lines $L_1$, $L_2$ in FIG. 2A.

Preferably, each heater bar, such as the vertical heater bar 61, is protected from direct contact with the web W by a movable sheath $T_1$ of polytetrafluoroethylene (Teflon) material which is carried in a dispenser 63 mounted on the backside of the platen 60. The sheath $T_1$ is advanced manually periodically by means of a knurled knob 64 which is connected to a vertically elongate shaft around which the Teflon material is wrapped after passing from its storage dispenser 63 and about the nose 61b of the vertical heater bar 61. Although not illustrated, a similar means is provided for advancing the lower Teflon sheath $T_2$ which covers the horizontal heater bar 62. Preferably the shaft about which the horizontal Teflon sheath $T_2$ wraps is connected to the vertical shaft about which the vertical Teflon sheath $T_1$ wraps by means of right angular bevel gears so that rotation of the knob 64 causes both the vertical and horizontal take-up shafts to rotate simultaneously. In the illustrated embodiment, the heating elements 61 and 62 are each preferably powered by 120 VAC proportional type (Triac controlled) electrical current which develops a surface temperature of about 350° F. to about 400° F. with a power consumption of about 150 watts. As well known in the art, the Teflon sheaths prevent the heater bars from sticking to the web W.

In order to stabilize the web W as the bag seams are being formed while enabling the web W to be stripped from the sheathed heater bars 61, 62, a pair of elongate stripper bars 65a, 65b are provided in spaced parallel relation on opposite sides of the vertical heater bar 61. In like manner, a pair of horizontal stripper bars 66a, 66b extend in spaced parallel relation on opposite sides of the horizontal heater bar 62. The vertical stripper bars 65a, 65b are mounted to and project upwardly from the upper horizontal stripper bar 66b for movement in unison therewith.

The stripper bars 65a, 65b and 66a, 66b are each mounted for elastic movement relative to their associated jaw assemblies. To this end, an air spring 68, best seen in FIGS. 8, 9 and 10, and guide pins (not shown) mount the two vertical stripper bars 65a, 65b and the upper horizontal stripper bar 66b to the primary jaw platen 67. The lower stripper bar 66a is similarly elastically connected to the platen panel 67, by a helical compression spring such as indicated at 69 in FIG. 8. For purposes to be discussed, the lower stripper bar 66a is provided by a knurled roller mounted for rotation at its opposite axial ends in low friction bearings each of which is mounted to the end of a rod, such as the rod 70 connected to the spring 69 and illustrated in FIG. 8. Thus, both the horizontal and vertical stripper bars 65a–66b of the primary jaw assembly $J_1$ are normally disposed in a forwardly projected position with respect to the primary jaw platen 67 and they are biased forwardly of their associated heater bars.

The secondary jaw assembly $J_2$ has anvils which cooperate with the stripper bars 65b and 66b to form the side edge and transverse seams in the web W. To this end, as best seen in FIG. 2B, a vertically elongate anvil bar 75b is mounted to the secondary jaw platen 76, and as best seen in FIG. 3, the anvil bar 75b is juxtaposed with respect to the stripper bar 65b on the primary jaw assembly $J_1$, being aligned therewith so that they operatively engage the folded plastic web W therebetween. A horizontal anvil bar 77b is similarly mounted to the secondary jaw platen 76 in juxtaposition with the horizontal stripper bar 66b of the primary jaw assembly $J_1$. See FIG. 3. As best seen in FIG. 3, an anvil bar 78 extends vertically in spaced parallel relation with the vertical anvil bar 75b and is aligned with the nose 61a of the heater bar 61 on the primary jaw assembly $J_1$. Similarly, a horizontally elongate anvil bar 79 is provided below the horizontal anvil bar 77b and is aligned with the nose 62a of the horizontal heater bar 62. See FIGS. 8 and 9.

As best seen in FIG. 8, the upper secondary jaw assembly anvil bar 77b is biased rightward away from its mounting platen 76 as by an air operated fluid actuator 80. The lower secondary jaw anvil bar 79 is rigidly affixed to platen 76 and moves therewith. With this structure, when the web W is interposed between the vertical heater bar 61 and its counterposed anvil 78, and heat and pressure applied, the vertical bag seam 51 is formed. As the seam 51 is being formed, the edge E is simultaneously separated therefrom by being pulled laterally due to the softening of the thermoplastic material of the web W.

Figure 11:
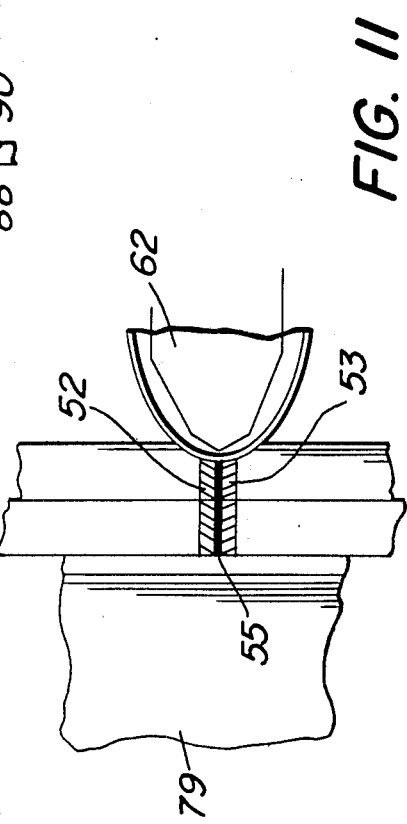
FIG. 11 is a greatly enlarged, fragmentary sectional view showing a portion of the horizontal heater bar engaged with the plastic web while forming the horizontal seams and weakened zone therebetween.

As best seen in FIG. 11, the bottom seam 52 and top seam 53 (FIGS. 1 and 2A) are simultaneously formed when the horizontal heater bar 62 engages the web W and presses it against its anvil 79. As the top and bottom seams 52 and 53 are being formed, the web W is being provided with a weakened line of juncture 55 between the seams 52 and 53 due to the softening of the thermoplastic web W caused by heat and applied pressure and the somewhat sharp nose portion of the heater bar 62. During the heating portion of the cycle, pressure on the web W is increased by automatically increasing the pressure of the air admitted into the actuator cylinder 28. The increase in air pressure, of about 200%, ensures adequate seam formation and softening of the web W along the weakened line of juncture 55. Thus, not only does the single actuator cylinder 28 drive the jaws $J_1$, $J_2$, but it also enables the desired jaw engagement pressures to be controlled automatically.

The filled bag is separated along the weakened line of juncture 55 when tension is applied thereacross during the bag separating portion of the bag forming cycle. To this end, separation is effected by rupturing the web W along its weakened line of juncture 55 while the thermoplastic material is relatively soft and weak. By utilizing a rupturing action to effect separation, knives, hot wires and the like are eliminated, thereby eliminating the proclivity for such conventional cutting mechanisms to malfunction and require frequent periodic cleaning due to melted plastic accumulating thereon.

Figure 10:
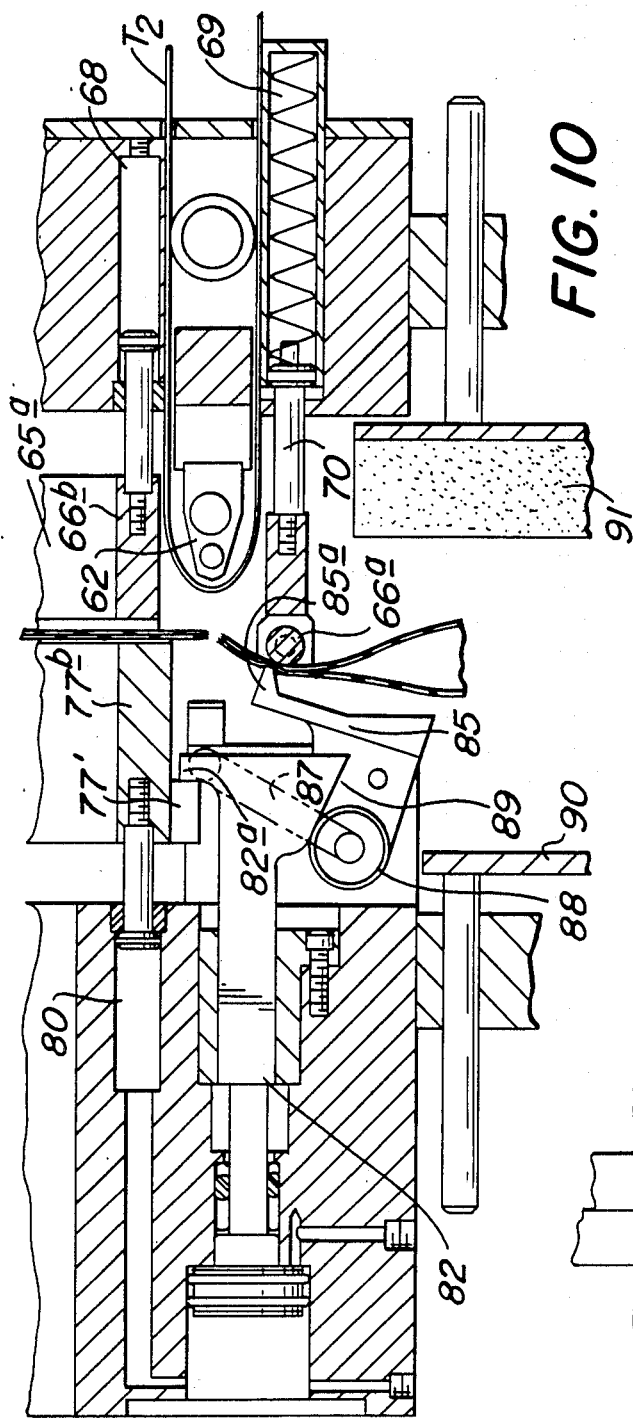
FIG. 10 is a view, similar to FIG. 8, but illustrating the components of the bag separating assembly in the course of rupturing the filled and sealed bag from the web from which it is formed as illustrated in FIG. 7.

The bag separating mechanism may best be seen by reference to FIGS. 8–10.

Referring first to FIG. 8, the bag separating mechanism, the location of which is indicated generally by S in FIG. 1, includes the lower separator bar roller 66a which engages laterally against the right side of the web W below the point of engagement therewith of the horizontal heater bar 62 and its back-up anvil 79. Juxtaposed with the bar roller 66a is a nip platen 85 mounted for pivotal movement about a horizontal axle 86 carried by the secondary jaw assembly $J_2$. The nip platen 85 has a forwardly projecting nose 85a which, as best seen in FIG. 10, is adapted to engage laterally against the left side of the web W and to overlie a portion of the bar roller 66a when it is operatively engaged with the nip platen 85. The nip platen 85 is biased in a clockwise direction about its axle 86 by an extension spring 87 connected to the nip platen 85 rearwardly of its axle 86 and behind the horizontal anvil 79.

For purposes to be described, a cam roller 88 is mounted for rotation coaxial with the point of attachment of the lower end of the extension spring 87 to the nip platen 85, and a rearwardly and upwardly inclined camming surface 89 is provided on the actuator rod 82. When the camming surface 89 is engaged with the cam roller 88 in the manner illustrated in FIG. 8, the nip platen 85 is maintained in its retracted position, i.e. as shown in FIG. 8. This is the relative position of the bag separating elements when they first are displaced into lateral engagement with opposite sides of the web W. In such position, the second horizontal separator bars 66b and 67b are urged into abutting engagement with the web W therebetween, thus frictionally gripping the web W.

The lower heater bar anvil 79 laterally engages the web W while its cooperating horizontal heater bar 62 is spaced laterally therefrom. The nose 85a of the nip platen 85 is engaged with the left side of the web W and the lower spreader bar roller 66b is engaged with the right side of the web W opposite the separator platen 85. This is the relative position of the machine elements at the start of the bag making cycle as illustrated schematically in FIG. 5 after having been displaced thereinto from the home position illustrated schematically in FIG. 4, and as illustrated in FIGS. 1 and 2. As discussed above, this motion of the machine elements occurs when the fluid actuator A is pressurized to pull its operating rod 27 inwardly and thereby pivot the rocker shaft 25 clockwise.

During the next phase of the bag making cycle, the fluid actuator A continues to pull its operating rod 27 inwardly. As this occurs, the primary jaw assembly $J_1$ continues to move leftward toward the centerline of the web W, such as in the manner illustrated schematically in FIG. 6. When the primary jaw assembly $J_1$ reaches the limit of its excusion, the vertical and horizontal heating bars 61 and 62 engage the web W and are backed-up by their complementary anvils, and heat is applied to the web W therebetween for forming the vertical seam 51 and horizontal seams 52 and 53 as discussed heretofore. This may best be observed by reference to FIG. 9, wherein the horizontal heater bar 62 is shown engaged against the right side of the web W and its cooperating anvil 79 engaged against the left side thereof. In this position, it will be noted that the lower roller 66a is engaged against the right side of the web W and the nip platen 85 is engaged against the left side of the web W, forming a nip therewith.

After a heating cycle of predetermined duration, such as discussed above, the acutator A is cycled in the reverse direction and its operating rod 27 extended. This causes the rocker shaft 25 to rotate in the counterclockwise direction, such as in the manner illustrated in FIG. 7. During such movement, the vertical stripper bars 65a, 65b, 75b initially remain engaged with opposite sides of the web W while the horizontal stripper bars 66b and 77b cooperate to grip the web W therebetween. The elastic connections between the horizontal stripper bars 66b and 77b and their respective mounting platens permit them to remain engaged with the web W on its centerline $C_L$ as the platens separate due to the reverse rotation of the rocker shaft 25. As the platens separate from one another, the lower anvil 79 separates from the horizontal heater bar 62, since these elements are non-relatively movably carried by their movable platens. As the platens 67, 76 continue to separate, the movable nip platen 85 begins to pivot in the clockwise direction about its axle 86 causing its associated roller 66b to rotate about its axis. This motion creates a downward tension on the filled bag and thereby ruptures the same along the weakened line of juncture 55 described above. The nip platen nose 85a ensures a positive separating action. See FIG. 10.

After the movable platens 67, 76 return to their home positions, such as illustrated schematically in FIG. 4, the nip platen fluid actuator 81 is signalled to move leftward, as by air pressure being introduced to the rod end of the piston thereof. This causes the camming surface 89, engaged with the cam roller 88, to pivot the nip platen 85 counterclockwise about its axle 86 for returning it to its retracted position illustrated in FIG. 8. Simultaneously, the horizontal separator bar 77b is retracted due to the interengagement of a tang 82a on the actuator rod 82 with a shoulder 77' on the underside of the horizontal separator bar 77b. This action ensures release of the filled bag from the bag 66b and nip platen 85, permitting the bag to drop freely by gravity into an appropriate receptacle. Thereafter, the web W is indexed downwardly and the cycle repeated.

To prevent too much air from being contained in the bag before its top seam is formed, the filled bag is compressed slightly between a back-up plate 90 carried on the secondary jaw assembly $J_2$ and an elastic pack, such as a sponge 91 carried on the primary jaw assembly $J_1$. See FIG. 2. The back-up plate 90 and elastic pad 91 are juxtaposed on opposite sides of the filled bag and are movably mounted relative to their respective jaw assemblies by small fluid actuators, or air cylinders, 92 and 93, respectively. The fluid actuators 92, 93 are operatively connected in the control circuitry to retract quickly after making initial contact with the filled bag to ensure that only sufficient pressure is applied to the partially filled bag to expel the air but not to damage the bag or parts contained therein.

If desired, the machine M can be used to form bag headers. This is accomplished by modifying the control circuitry to provide a pair of transverse seams in spaced parallel relation at the upper end of the bag. For instance, the lower one of the seams provides the top bag closure while the upper one of the seams, being spaced vertically therefrom, cooperates therewith to form a margin at the top of the bag. Preferably, printed bag material is used having printing in zones corresponding to the locations of the headers.

In view of the foregoing, it should be apparent that the present invention now provides an improved method and apparatus for continuously forming, filling, sealing and separating bags from a web of thermoplastic sheet material. The method and apparatus functions efficiently with minimal operator supervision to produce filled bags in a relatively high speed manner. The apparatus is relatively simple in construction, and therefore highly reliable in operation. Because of its relative simplicity, the apparatus can be manufactured and operated economically.

While a preferred method and apparatus have been described in detail, various modifications, alterations and changes may be made without departing from the spirit and scope of the present invention as defined in the appended claims.

We claim:

1. Apparatus for filling plastic bags formed from a web of plastic material, comprising:

frame means for receiving said web, means for guiding said web in a longitudinally folded manner downwardly into the frame means, complementary heat sealing jaw means mounted in said frame for lateral reciprocation relative to said folded web to provide a longitudinal side seam and a transverse bottom seam cooperable with said folded web to provide an upwardly open pocket and to form a transverse top seam for closing the pocket after the web has been advanced downwardly a predetermined extent relative to the frame means, drive means connected to said heat sealing means for effecting said reciprocation thereof and for applying to said web a predetermined pressure for forming said seams, gripper means carried on said jaw means for releasably engaging opposite sides of said web above the location of formation of said top seam of said pocket, and separator means mounted in said frame means below said gripper means for frictionally engaging opposite sides of said web below the location of formation of said top seam therein and cooperable in timed relation with said heat sealing means during formation of said top seam to tension said web longitudinally and thereby to cause a filled and closed bag to be formed and separated from the folded web, whereby plastic bags are filled and closed in a continuous manner.

2. Apparatus according to claim 1 including shaped surface means on said complementary heat sealing means cooperable during formation of said transverse top seam on said pocket to simultaneously form said transverse bottom seam on an immediately upstream pocket and to provide a weakened line of juncture between said top and bottom pocket seams for permitting said bag to be separated from said web when said tension is applied by said separator means.

3. Apparatus according to claim 2 wherein said shaped surface means includes a flat platen and a tapered nose which cooperate tor form said top and bottom pocket seams on opposite sides of said weakened line of juncture.

4. Apparatus according to claim 3 wherein said separator means includes a roller laterally engaging said web adjacent to the location of formation of said top seam and rotatable about a horizontal axis, and nip means juxtaposed with said roller on the opposite side of said web for creating friction between said web and said roller, and means for rotating said roller about its axis for frictionally tensioning said web downwardly to separate said filled bag therefrom.

5. Apparatus according to claim 4 wherein said nip means includes a nip platen normally disposed alongside said web and engaging said opposite side of said web, and means for moving said nip platen relative to said roller axis for rotating said roller and thereby tensioning said web to effect said bag separation.

6. Apparatus according to claim 5 wherein said nip platen moving means includes means mounting said platen to pivot about a horizontal axis below the rotational axis of said roller, and means for pivoting said platen about its axis.

7. Apparatus according to claim 6 wherein said platen pivoting means includes means for biasing said platen toward said roller and web and for pivoting the platen about its horizontal axis, and means for returning said platen to its normal position alongside said web after separation of said bag therefrom.

8. Apparatus according to claim 7 including means for biasing said roller into continuous engagement with said nip platen during said pivotal motion of said platen toward said roller.

9. Apparatus according to claim 8 wherein both said nip platen and said roller are carried on said heat sealing means and are movable relative thereto to effect said bag separation as said complementary heat sealing means move away from said web.

10. Apparatus according to claim 9 wherein said nip platen has a laterally extending protrusion engaging said folded web below said weakened line of juncture and above said roller for aiding in separating said web from said gripping means as said heat sealing means separate.

11. Apparatus according to claim 1 wherein said drive means includes a rocker shaft pivotally mounted in said frame alongside said folded web, linkage means connecting said rocker shaft to said complementary heat sealing means for causing said heat sealing means to move toward said folded web when said rocker shaft is pivoted in one direction and away from said folded web when pivoted in the opposite direction, a fluid pressure operated actuator connected to said rocker shaft for pivoting the same in said opposite directions, and means for increasing the fluid pressure in said actuator as said complementary heat sealing means advance into close proximity with one another to form said pocket seams.

12. Apparatus according to claim 11 wherein said complementary heat sealing means includes a heater member and an anvil member both mounted for sliding movement toward and away from one another in said frame, a link connecting one of said members to said shaft and lost motion linkage means connecting the other of said members to said shaft, said lost motion linkage means causing its connected member to stop moving at a predetermined location with respect to said web while said link causes the other member to continue moving as said rocker shaft pivots.

13. Apparatus according to claim 12 wherein said lost motion linkage means includes an angulated cam surface mounted to said frame and a cam follower engaging said cam surface and movably mounted to its connected member for movement vertically with respect to its normal path of movement as it approaches the folded web.

14. Apparatus according to claim 1 wherein the portion of said complementary heat sealing means that forms said longitudinal side seam extends for a distance which is at least about twice as long as the side seam formed in a single bag and extends along said folded web inwardly of its edges so that a pair of edge margins are formed between said side seam and the edges of the folded web, and including means for pulling said edge margins longitudinally and laterally of said web for separating said web edge margins from the web during forming and filling of the bags.

15. Apparatus according to claim 14 wherein said pulling means includes a constant tension take-up roller engaging said web edge margins and tensioning the same continuously so that the edge margins are separated from the web before the filled bag is separated therefrom.

16. Apparatus according to claim 15 wherein said top and bottom seam forming portions of said heat sealing means extend less than completely across the width of the folded web from its folded side.

17. Apparatus according to claim 1 wherein at least one of said complementary heat sealing means has a heated zone, and including a layer of tetrafluoroethylene fabric interposed between said heated zone of said heat sealing means and said web, and means for periodically advancing said fabric relative to said heated zone.

18. In apparatus for forming and filling plastic bags, including means for guiding a longitudinally folded web of plastic as it descends vertically, complementary laterally movable heat sealing means cooperable to provide transverse and longitudinal seams in the folded web for defining therein an upwardly open pocket and to form a closure for the pocket after having been loaded by gravity, and means for subsequently separating the loaded pocket from the web, the improvement wherein said pocket separating means comprises means for gripping the web transversely above the transverse seam forming the pocket closure, and means cooperable with said heat sealing means after a predetermined heating time interval for applying tension to said pocket longitudinally of the web and thereby rupturing the loaded pocket from the web.

19. Apparatus according to claim 18 wherein said web tensioning means includes means providing a roller engaging one side of said web, means providing a nip on the opposite side of said web in juxtaposition with said roller, and means for effecting rotation of said roller for pulling on said web.

20. Apparatus in accordance with claim 19 wherein said nip providing means includes a planar surface disposed vertically alongside the web opposite the roller, and means for displacing said surface relative to the rotational axis of the roller for effecting said roller rotation and thereby tensioning the web.

21. Apparatus according to claim 20 including means for pivoting the nip surface and means for biasing the roller laterally toward said nip surface with the web engaged therebetween for thereby effecting said rotation of the roller and said tensioning of the web.

22. Apparatus according to claim 21 wherein said nip forming surface has a finger protrusion overlying at least a portion of the roller for engaging the web laterally above the roller to aid in separating the loading bag from the web.

23. In a method of forming and filling bags from a downwardly advancing web of plastic which is longitudinally folded to form a fold line and a pair of edges spaced therefrom, the improvement comprising the steps of:

heat sealing said web longitudinally inwardly adjacent to said edges to form an elongate side seam having a length at least as long as two filled bags, simultaneously with the formation of said side seam, heat sealing the web transversely to form a transverse seam having a heat weakened central portion located between the bottom of one pocket and the top of a precedingly formed pocket, loading the one pocket from above, gripping the loaded pocket transversely above its bottom seam, and while said transverse seam is in its heat weakened condition, tensioning the web from below for rupturing said web along said weakened portion and thereby separating a filled bag from the web.

24. A method according to claim 23 wherein said web tensioning step is effected by frictionally engaging said web between a roller and a nip platen, and while biasing the roller and nip platen toward one another, displacing the nip platen relative to the rotational axis of the roller.

25. A method according to claim 24 wherein said longitudinal seam is spaced inwardly from said web edges and said transverse seam formed in said web extends transversely from the longitudinal fold to at least said longitudinal seam but short of said web edges to form an edge margin, and including the step of continually pulling said edge margin downwardly and laterally with respect to said web for separating said web edge marging from the folded web before said filled bags are separated from the web.

* * * * *